May 6, 1930. W. LIPSKY 1,757,869
VEHICULAR SIGNAL
Original Filed Feb. 21, 1929
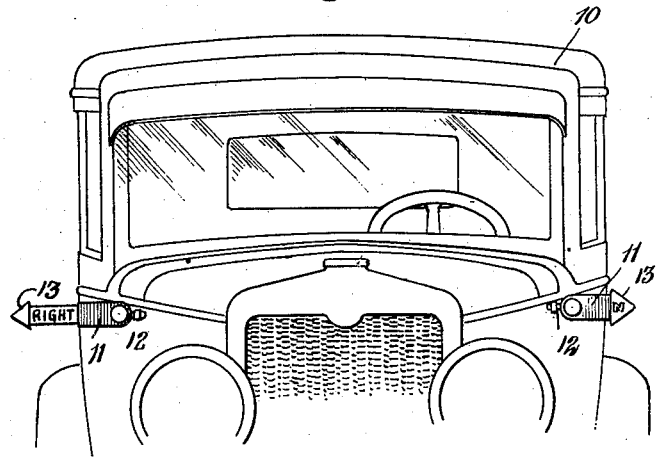
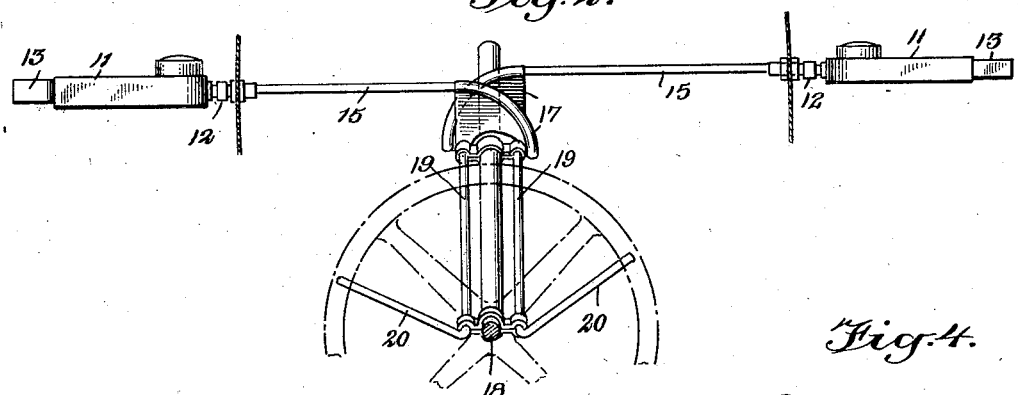
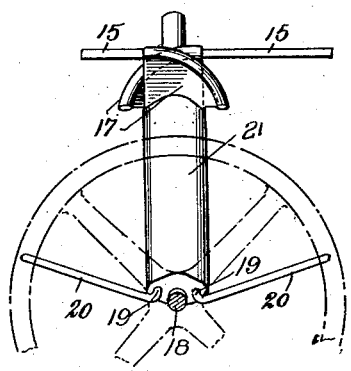
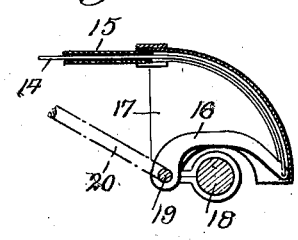
WITNESSES
INVENTOR
William Lipsky
BY
ATTORNEYS Patented May 6, 1930

1,757,869

UNITED STATES PATENT OFFICE

WILLIAM LIPSKY, OF NEW YORK, N. Y.

VEHICULAR SIGNAL

Original application filed February 21, 1929, Serial No. 341,721. Divided and this application filed October 29, 1929. Serial No. 403,302.

This invention relates to vehicular signals.

It is among the objects of the present invention to provide a novel and improved vehicular signal adapted to advise traffic in front of or behind the vehicle as to the turning direction thereof.

A further object of the present invention is to provide a vehicle indicating body in which a turning indicator is adapted to be received within a casing and to extend therefrom for operative position.

Another object of the present invention is to provide a vehicle indicator operable through means positioned on the steering column whereby the indicators may be manually controlled for visual positioning.

Numerous other objects and features of the present invention will be apparent from a consideration of the following specification taken in conjunction with the accompanying drawings, and in which Figure 1 is a front elevation of a vehicle with which is associated my improved signal device;

Fig. 2 is a view illustrating the manual control means for the signal;

Fig. 3 is a detail view of the control arm;

Fig. 4 is a view of a modified form of the control means as shown in Fig. 2.

Referring more particularly to the drawings, the signal is adapted for positioning adjacent the cowl of a vehicle, the vehicle being illustrated at 10 in Fig. 1. The signal is preferably provided on either side of the vehicle and includes a casing 11 associated with the vehicle through a hollow ball-and-socket connection 12.

The signal casings 11 are preferably telescopic in conformity with the signals of my co-pending application, Serial No. 341,721, filed February 21, 1929, of which the present application is a division.

The signals include the outer casing 11 and the inner casing 13 which is slidable within the outer casing to be extended for the display of suitable indicia borne thereon, as, for instance, "Right," as shown on the left of Fig. 1, the opposite casing being provided with appropriate indicia to correspond therewith.

The outer ends of the inner casing are provided with arrow heads which project from the inner casing to indicate the direction of turn.

For controlling the movements of the inner member 13, its inner end is associated with a similar flexible actuating member 14, as shown in Fig. 3, which is adapted to pass through an aperture in the case of the signal. The actuating member 14 extends through a protective tube 15, the opposite end being associated with an actuating arm 16, which is mounted within a protecting shell 17 associated upon the steering column 18 as indicated in Figs. 2 and 3. The arm 16 is actuated by controller arms 19 which extend parallel from the steering column and preferably terminate just below the steering wheel, the extremities being angularly disposed to provide control fingers 20 which extend under the wheel, whereby they may be readily rotated for rotating the arm 16, and extending or withdrawing the actuating member 14, whereby the member 13 is readily manually controlled for inward or outward movement in the casing 11.

In that form of the invention illustrated in Fig. 4, it will be seen that the controller arms 19 may be mounted within the steering column casing 21 and be protected thereby.

From the foregoing it will readily be seen that the present invention provides a novel and improved structure efficient in operation, easily applicable, and well designed to meet the demands of economic manufacture. It will be understood that the device is manually controlled from the driving position. It will further be understood that numerous changes and modifications in the specific structure herein shown and the full use of equivalents may be resorted to without departing from the spirit or scope of the invention as outlined in the appended claims.

What is claimed is:

1. In a motor vehicle, the combination with signaling apparatus, of semi-flexible operating arms therefor, and means for operating said arms, comprising operating shafts associated with the steering column and extending parallel thereto, the upper extremity of said operating shafts being angularly extended to provide operating handles adjacent to and below the periphery of the steering wheel, the lower end of said shafts being provided with curved extensions lying in planes transverse to the axes of said shafts, whereby upon movement of said shafts, said extensions may partially surround the steering column.

2. In a motor vehicle, the combination with signaling apparatus, of semi-flexible operating arms therefor, and means for operating said arms, comprising operating shafts associated with the steering column and extending parallel thereto, the upper extremity of said operating shafts being angularly extended to provide operating handles adjacent to and below the periphery of the steering wheel, the lower end of said shafts being provided with curved extensions lying in planes transverse to the axes of said shafts whereby upon movement of said shafts, said extensions may partially surround the steering column, and a housing associated with said extensions for receiving said extensions and the connected ends of said semi-flexible arms.

WILLIAM LIPSKY.